US006527921B2

(12) United States Patent
Kirk et al.

(10) Patent No.: US 6,527,921 B2
(45) Date of Patent: Mar. 4, 2003

(54) ELECTROCHEMICAL CELL STACKS

(76) Inventors: Donald W Kirk, Dept. Chem Eng. and Applied Chem., University of Toronto, 200 College Street, Room 246, Toronto, Ontario (CA), M5S 3E6; John W Graydon, Dept. of Chem Eng. and Applied Chemistry, University of Toronto, 200 College Street, Room 246, Toronto, Ontario (CA), M5S 3E6; Steven J Thorpe, Dept. of Chem Eng. andApplied Chemistry, Univsersity of Toronto, 200 College Street, Room 246, Toronto, Ontario (CA), M5S 3E6

( * ) Notice: Subject to any disclaimer, the term of this patent is extended or adjusted under 35 U.S.C. 154(b) by 174 days.

(21) Appl. No.: 09/813,793

(22) Filed: Mar. 22, 2001

(65) Prior Publication Data

US 2002/0100681 A1 Aug. 1, 2002

(30) Foreign Application Priority Data

Feb. 1, 2001 (CA) ............................................. 2333859

(51) Int. Cl.[7] ............................. C25B 9/00; C25B 13/00
(52) U.S. Cl. ........................ 204/255; 204/256; 204/257; 204/258; 204/265; 204/266; 204/282
(58) Field of Search ................................. 204/255, 257, 204/263, 279, 262–266, 256, 258, 282

(56) References Cited

U.S. PATENT DOCUMENTS

| 3,652,431 A | 3/1972 | Reynolds |
| 4,042,481 A | 8/1977 | Kelly |
| 4,124,478 A * | 11/1978 | Tsien et al. ................. 204/255 |
| 4,339,324 A | 7/1982 | Haas |
| 4,424,106 A | 1/1984 | Rossoshinsky et al. |
| 4,464,242 A | 8/1984 | Boulton |
| 4,469,580 A | 9/1984 | Deborski et al. |
| 4,746,415 A * | 5/1988 | Boulton et al. ............. 204/253 |
| 5,480,515 A | 1/1996 | Gallien |
| 5,665,211 A | 9/1997 | Leppanen et al. |
| 5,733,422 A | 3/1998 | Lin |
| 6,080,290 A | 6/2000 | Stuart et al. |
| 6,086,733 A | 7/2000 | Carey et al. |

FOREIGN PATENT DOCUMENTS

| GB | 2 323 700 | 9/1998 |
| WO | WO 98/29912 | 7/1998 |

* cited by examiner

Primary Examiner—Donald R. Valentine
(74) Attorney, Agent, or Firm—Jeffrey S. Melcher; Manelli Denison & Selter, PLLC

(57) ABSTRACT

An electrochemical cell stack comprising stack walls and a plurality of electrolytic cells within the stack walls, each cell comprising cell members selected from an anode a cathode; a membrane separator frame formed of a non-conductive material and having a frame first planar peripheral surface; a frame second planar peripheral surface; and a central portion defining a membrane-receiving aperture; a membrane within the aperture to provide an anolyte circulation chamber and a catholyte circulation chamber distinct one from the other within the frame, an impermeable cell end wall formed of a non-conductive material between the anode and cathode and the anodes and cathodes of adjacent cells of said stack; wherein each of said anode, said cathode, said separator frame and said end wall has a portion defining an anolyte flow inlet channel, a catholyte flow inlet channel, a spent anolyte channel and a spent catholyte channel; said anolyte flow inlet channel and said spent anolyte channel are in communication with said anolyte circulation chamber, said catholyte flow inlet channel and said spent catholyte channel are in communication with said catholyte circulation chamber. The cell stack is of greatly reduced footprint, operable at relatively high temperatures and pressures and which is stable under current load.

16 Claims, 9 Drawing Sheets

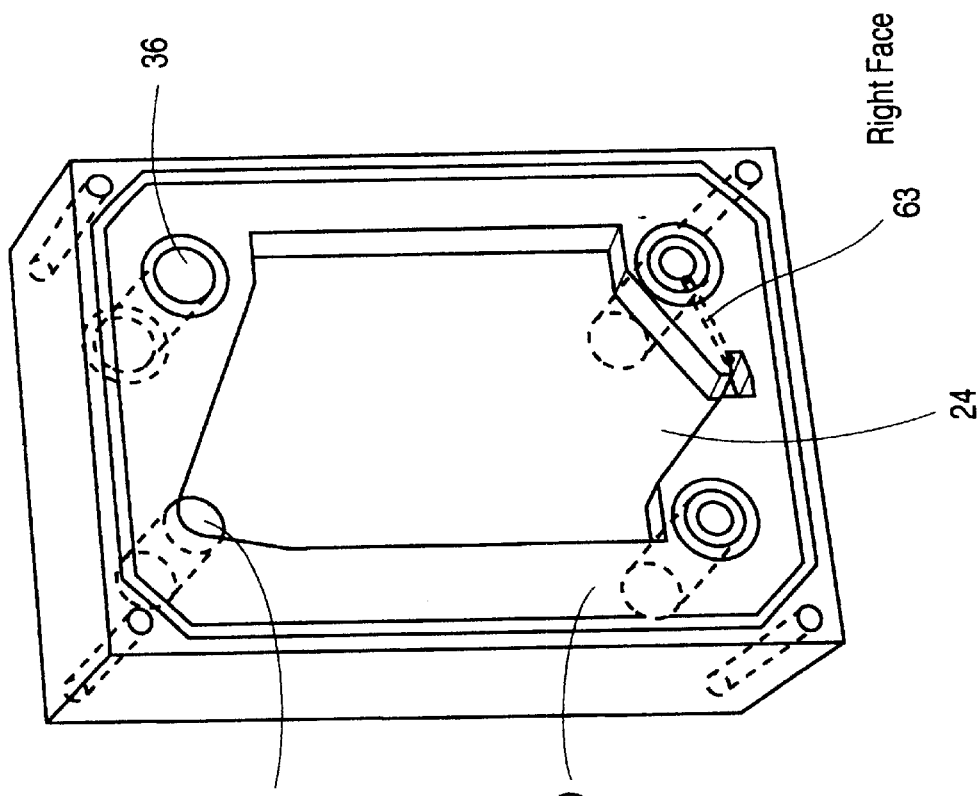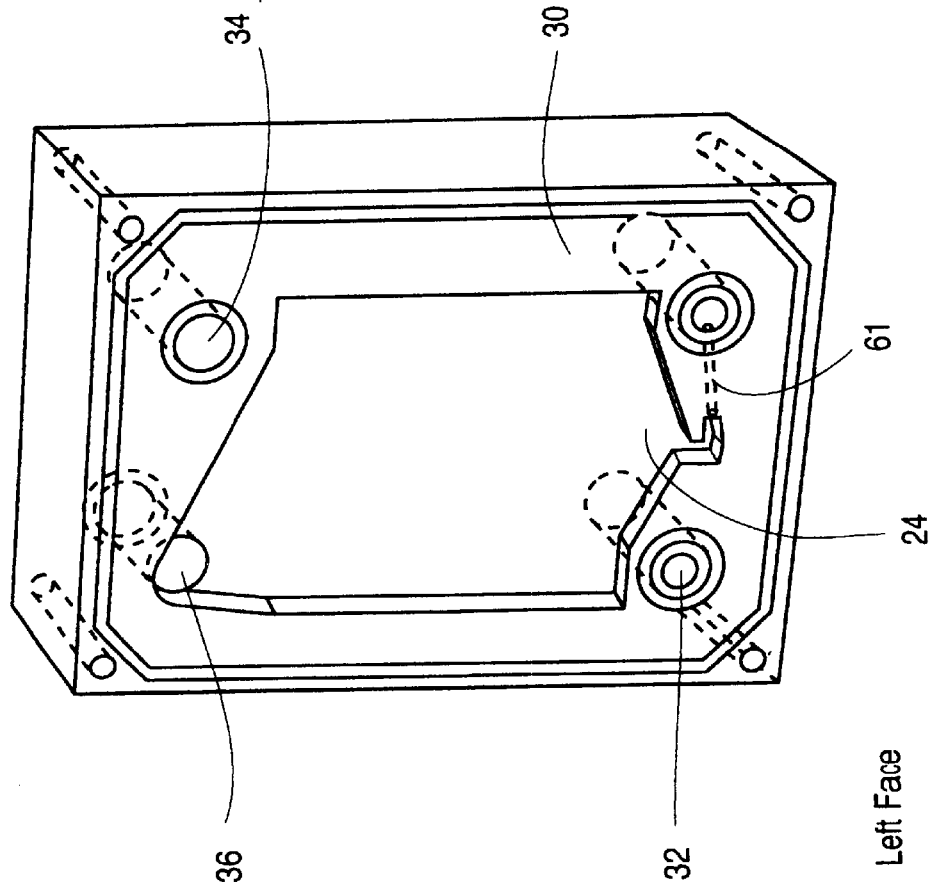

900

920

ELECTROCHEMICAL CELL STACKS

FIELD OF THE INVENTION

This invention relates to electrochemical cell stacks, particularly, to monopolar filter press cell stacks, and more particularly to internally pressurized monopolar water electrolytic cells for the production of hydrogen and oxygen.

BACKGROUND TO THE INVENTION

Electrosynthesis is one example of an electrochemical process comprising a method for the production of chemical reaction(s) that is electrically driven by passage of an electric current, typically a direct current (DC), in an electrochemical cell through an electrolyte between an anode electrode and a cathode electrode from an external power source. The rate of production is proportional to the current flow in the absence of parasitic reactions. For example, in a liquid alkaline water electrolysis cell, the DC current is passed between the two electrodes in an aqueous electrolyte to split water, the reactant, into component product gases, namely, hydrogen and oxygen where the product gases evolve at the surfaces of the respective electrodes.

Water electrolysers have typically relied on membranes or separators between the two halves of an electrolysis cell to ensure that the two gases, namely, oxygen and hydrogen produced in the electrolytic reaction are kept separate and do not mix. Each of the separated gases must be discharged from the cell at essentially the same pressure since membranes and separators fail with pressure differential. Simple pressure control systems, such as a small water column of several centimeters in height for each gas and discharge to atmospheric pressure are used to control the pressure within this pressure differential.

In the conventional monopolar cell design in wide commercial use today, one cell or an array of cells in parallel is contained within one functional electrolyser, cell compartment, or individual tank. Each cell is made up of an assembly of electrode pairs in a separate tank where each assembly of electrode pairs connected in parallel acts as a single electrode pair. The connection to the cell is through a limited area contact using an interconnecting bus bar such as that disclosed in Canadian Patent No. 3,02,737, issued to A. T. Stuart (1930). The current in the form of a flow of electrons is taken from the cathode bus bar via an electrical connection to a portion of a cathode in one cell, then through the electrolyte in the form of ions to the anode of that cell and then to the anode bus bar using a similar electrical connection. The current is usually taken off one electrode at several points and the connection made by means of clamps, soldered joints, mechanical screw connections and the like.

Electrolysis apparatus having pressurized external cell structures are known for producing hydrogen. For example, U.S. Pat. No. 5,665,211, issued 1997, describes a pressurized container within which is an electrolytic cell. There is no integration of the cell itself as the pressure containment device, and, thus, the apparatus is bulky and heavy. U.S. Pat. No. 3,652,431, issued 1972, describes an electrolysis cell where external pressure from a liquid such as water is used to support a container in which pressurized electrolysis is conducted. U.S. Pat. No. 4,042,481, issued 1977, describes a pressurized tank containing cylindrical porous anode and cathode tubes which allow escape of the oxygen and hydrogen produced. However, the apparatus requires the need for a tank to house cells and, thus, this does not represent efficient use of overall space or footprint. There is also the potential for mixing of oxygen and hydrogen produced if gas does not diffuse through the porous electrode tubes. The cylindrical configuration of the anodes and cathodes present fabrication challenges and the spacing of these electrodes will require substantial room to prevent non-uniform currents if multiple cells are used. U.S. Pat. No. 5,733,422, issued 1998, describes a tank with a header box wherein the top is screwed onto the side wall plates. Again, this is clearly not a design suitable for lightweight and inexpensive polymeric materials.

There is, therefore, a need for electrolytic cells, particularly, water electrolysers, which do not suffer from the aforesaid disadvantages.

SUMMARY OF THE INVENTION

The present invention provides an electrolytic cell stack having a beneficial novel relationship of cell components involving the inverse structural role of some components, through the use of a single electrolyte circulation and membrane frame within each cell. There is no need for end-boxes and compressible elastomeric materials which, however, may be optional. The circulation and membrane frame preferably, is formed of a structural plastics material, which can provide support to thin foil electrodes if the latter are used. In the absence of gaskets and compressible elastomeric frames, advantageous higher operating temperatures can be readily attained. This is particularly so when the cell stack is pressurized as hereinafter described.

In one aspect, the invention provides an electrochemical cell stack comprising stack walls and a plurality of electrolytic cells within the stack walls, each cell comprising cell members selected from an anode; a cathode; a membrane separator frame formed of a non-conductive material and having a first side and a second side opposite to said first side;

(a) a frame first planar peripheral surface on said first side;
(b) a frame second planar peripheral surface on said second side; and
(c) a central portion defining a membrane-receiving aperture;

a membrane within the aperture which provides an anolyte circulation chamber and a catholyte circulation chamber distinct one from the other within said frame; an impermeable cell end wall formed of a non-conductive material between said anode and said cathodes and the anodes and cathodes of adjacent cells of the stack; wherein each of said anode, said cathode, said separator frame and said end wall has a portion defining an anolyte flow inlet channel, a catholyte flow inlet channel, a spent anolyte channel and a spent catholyte channel; and wherein said anolyte flow inlet channel and said spent anolyte channel are in communication with said anolyte circulation chamber, and said catholyte flow inlet channel and said spent catholyte channel are in communication with said catholyte circulation chamber.

In one preferred embodiment, the invention provides a cell stack as hereinabove defined wherein said anode has an anode first planar surface which abuts said frame first planar peripheral surface as to define with said member said anolyte circulation chamber within the confines of said frame, and said cathode has an cathode second planar surface which abuts said frame second planar peripheral surface as to define with said member said catholyte circulation chamber within the confines of said frame.

In another preferred embodiment, the invention provides a cell stack as hereinabove defined wherein said anode in whole or in part is disposed within said anolyte circulation chamber and said cathode in whole or in part is disposed within said catholyte circulation chamber. In this later defined cell stack, one or both of the anode and the cathode are in contact with the membrane, on opposite sides thereof, within the respective electrolyte circulation chamber, as for example, a laminate with or coating on the membrane.

The production of a bilayer or trilayer porous assembly offers the distinct advantages of minimal electrode/membrane thickness and, hence, inter-electrode cell resistance, as well as ease of processing on a continuous basis by the integration of separate parts, namely, current carrier+activation+membrane, using known, suitable processing methods.

The production of such a bi or trilayer composite structure can be carried out, for example, by utilizing a core membrane material and metallizing this externally, wherein the membrane may be either polymeric or ceramic in nature, formed by, for example, weaving, felting, tape casting, sintering and the like. The metallizing process can be selected, but not limited to one of plasma vapour deposition, chemical vapour deposition, plasma spraying, electrodeposition and the like. In an alternative and inverse process, a membrane material, can be deposited on an existing porous electrode structure. These two processes can be used either separately, or, in combination to produce a trilayer structure.

The aforesaid herein defined cell stacks are more preferred wherein said anolyte circulation chamber has a lower portion defining an inverted triangle having an apex defining an anolyte entry port in communication with said anolyte flow inlet channel, and an upper portion defining a triangle having an apex defining an anolyte exit port in communication with said spent anolyte channel; and said catholyte circulation chamber has a lower portion defining an inverted triangle having an apex defining a catholyte entry port in communication with said catholyte flow inlet channel, and an upper portion defining a triangle having an apex defining a catholyte exit port in communication with said spent catholyte channels.

More preferably, the cell stack as hereinabove defined has the anolyte entry port central of the frame; the anolyte exit port is adjacent a first periphery of the frame; the catholyte entry port is central of the frame; and the catholyte exit port is adjacent the periphery remote from the first periphery.

The cell stack as previously defined further comprises a plurality of compressible sealing members disposed between adjacent cell members selected from the anode, the cathode, the frame and the cell wall, at the peripheries thereof and adjacent the anolyte and catholyte flow inlet channels and the spent anolyte and catholyte channels which are not facing the upper portion defining a triangle having an apex defining a catholyte exit port or anolyte exit port channel. It should be noted that the offset pairs of seals at the peripheries contains the large pressure differential with the exterior while the seals at the inlet manifolds contain a small pressure differential of about 1 psi to allow differential flow rates in the anolyte and catholyte flow channels and the seals at the spent electrolyte ports have essentially no pressure differential to contain but must prevent electrolyte from mixing and contaminating the two product streams. With regard to the spent electrolyte ports, with the preferred design having thin foil electrodes, it is not possible to provide a seal against the unsupported electrodes which are facing the upper portion of the frame member defining a triangle having an apex defining a catholyte exit port or anolyte exit port channel. Since there is essentially zero pressure drop between the circulation chambers, it is only necessary to prevent the electrolyte from flowing behind the electrode to the opposing electrolyte circulation chamber by providing one seal at the exit ports per circulation frame member. This seal is easily achieved on the side of the circulation frame member which does not have the open triangle exhaust port. Thus only one half of the exit ports are sealed and the seals alternate between one outlet. In another configuration (bipolar) described later, this alternating seal configuration is not sufficient for preventing electrolyte mixing and a stiffer electrode must be used to allow for a seal on one side of the electrode at the exit port.

Most preferably, the compressible sealing members are o-rings, and the cell members have portions defining o-ring receiving recesses.

The frames and cell end walls are most preferably formed of a structural plastics material. The anodes and cathodes are most preferably in the form a metallic foil or the like having a thickness, preferably selected from 0.05–0.10 mm. In the case of a bipolar cell stack design, hereinafter described, the electrodes have a sufficient stiffness to hold a seal with an o-ring. Thus, stiffer electrodes will be preferred in that configuration.

Although not limiting, the invention is particularly of benefit in electrochemical processes that produce one or more gaseous products, such as chlorine, hydrogen and oxygen, the latter two from the electrolysis of aqueous potassium hydroxide electrolyte solutions, particularly in a monopolar filter press structural arrangement.

In a further aspect, the invention provides an improved process for providing hydrogen from a monopolar electrolytic cell having cell walls under an external pressure; anolyte solution having an anolyte liquid level; catholyte solution having a catholyte liquid level; the process comprising generating oxygen at an oxygen pressure within the cell above the anolyte; generating hydrogen at a hydrogen pressure within the cell above said catholyte; the improvement wherein each of the oxygen pressure and the hydrogen pressures provide a positive pressure differential greater than the external pressure.

The external pressure is provided most generally by air, and at an ambient pressure of 1 atmosphere.

The positive pressure is readily attainable within the cell up to about 8 atmospheres, but a practical pressure is preferably selected from 2–6 absolute atmospheres.

The production of hydrogen from prior art monopolar cell stacks has been limited to current densities of less than about 500 $mA/cm^2$ at steady state operation. The primary problem is that at high current density the volume of gas produced at the electrode surfaces becomes so great that cell resistance rises dramatically, liquid contact with the electrode surface is reduced and parts of the electrode may cease to function, unsteady liquid and gas flows develop and energy efficiency decreases dramatically. Resistive heating exacerbates the problems causing electrode heating and damage to cell components which renders the cell dangerous to operate.

A multicell stack according to the invention avoids these problems and allows current densities of greater than 750 $mA/cm^2$ to be run at steady state almost indefinitely (100's of hours). Surprisingly, these high current densities have been run with smooth, non-activated planar electrodes which are in thin foil form and with "zero gap" cells (5.25 mm) and plastic frame members. It would be expected that at high current density (>500 $mA/cm^2$) resistive heating in the thin foil electrodes and from the resistance in the electrolyte due to gas formation, would cause this type of cell to fail. In fact, this cell has been run for hundreds of hours at current densities up to 600 $mA/cm^2$ without damage. The operation clearly demonstrates that the resistance buildup at high current density has been overcome. A larger power supply and thicker electrodes would allow even higher current densities to be run.

The accomplishment means that small electrolysis cells using this design are able to produce large amounts of hydrogen required for industrial regenerative and personal fuel appliance applications and space limited configurations. A side benefit is that pressurized hydrogen is available for direct storage in a vessel or media, such as metal or chemical hydride or as an economical source of pre-pressurized hydrogen for mechanical or electrical compressors for high-pressure use.

The invention is of particular, but not limiting, value in monopolar electrolyte cell stacks, and, accordingly, in a further aspect the invention provides a monopolar electrolytic cell stack having a cell stack as hereinabove defined wherein said stack walls are subjectable to a cell stack external pressure; said anode operably produces oxygen at an oxygen pressure within said anolyte chamber; said catholyte operably produces hydrogen at a hydrogen pressure within said catholyte chamber; means for providing each of said oxygen pressure and said hydrogen pressure with a positive pressure differential greater than said cell stack external pressure; and said membrane separator frames and said impermeable cell end walls as formed of a structural plastics material.

In one embodiment, the cell stack according to the invention, is based on the monopolar electrolysis cell stack design having the anodes and cathodes in a folded configuration known as a "double electrode plate", but of relatively very narrow thickness in the form of a metal foil. The cell containment is by means of a thin polymer plate of "Noyel"® or like engineering plastic having an electrolyte slot and flow channels for both liquid inlet and gas outlet. A diaphragm or membrane is used to separate anolyte and catholyte. Sealing of the electrolyte within the cell is achieved by means of O-rings in grooves set in the plate to provide a leak free condition at all operating values of current. The electrolyte is pumped into the cells through flow constricted channels in each cell compartment.

The high current operation is achieved by valving off the oxygen and hydrogen outlet channels until a pressure of up to 6 atmospheres is achieved. In this mode, current densities of up to 1 A/cm$^2$ can be run at steady operation without damaging resistive heating effects. Without valving, the cell could not be run at more than 250 mA/cm$^2$ before excessive gassing caused unstable operation and damaging resistive heating. Prior art cells operating at steady state at 1 A/cm$^2$ with smooth planar electrodes are known, but do not have the advantages of the unitary electrolyte circulation and membrane frame according to the present invention.

The present invention provides, in one aspect, a process and apparatus for producing hydrogen gas and oxygen gas at an elevated pressure by electrolysis in an alkaline aqueous solution. Maintaining the hydrogen pressure above the catholyte liquid level within the cell offers the following advantages.

1. The drastic reduction in the volume of evolved gas lowers the electrical resistance of the mixture of electrolyte and gas bubbles within the cell compartment to produce a higher energy efficiency.
2. The smaller volume of gas also allows operation at higher current densities than is the case at lower pressures where the large volume of gas would form plugs within the cell compartment resulting in unstable operation or preventing electrolysis altogether.
3. The rate of flow of electrolyte required through the cell is much less. This decreases the size of the electrolyte channels required, the capacity of the pump, and the erosion and wear on all components of the cell caused by the high linear velocity of flowing electrolyte.
4. Separation of gas and liquid is easier since the volumetric flow rates of electrolyte and especially of the gases are much lower.
5. The hydrogen gas contains much less water vapour that may require subsequent removal.
6. Much less heat is lost from the stack due to the smaller amount of water that is evaporated.
7. Electrolysis can be carried out at temperatures above 100° C. for greater energy efficiency.
8. Pressurized hydrogen is directly available for moderate pressure applications. Alternatively, the pressure can easily be raised further using a single-stage compressor that is much cheaper to buy and operate than the compressor required if the same amount of hydrogen was at atmospheric pressure.

The pressurized cell stack when pressurized up to 8 atmospheres is substantially constructed of a polymeric material, such as, for example, "NOYEL"™ structural plastics material.

The stack, in one embodiment, is essentially supported only by the cell end walls and wherein the polymer frames are designed with sufficient width at the top, bottom and sides and in connection with the electrode members as to withstand the internal gas pressures without other internal support and metallic end stack members. In an alternative embodiment, internal support is provided by the frame members and not the cell end walls, which may be in the form of a non-conductive, electrolyte impermeable film or the like.

In the aspect of the present invention involving a cell stack capable of being operable at greater than ambient pressures, in the issue of pressure in the cell stack, there are three directions to be considered, namely, the ends, the sides and the top of the stack. The sides and top, although not quite of the same dimensions, can be considered together because they resist the pressure in the same way, i.e., by the stiffness of the structural plastics material and their contact with the electrode members. The ends resist pressure by being thick and stiff and by having, in the preferred embodiment, tie rods connecting the two metallic end plates. These ends must resist the pressure for two reasons, namely, one is simple containment and the second is to keep the plates in good contact with the O-ring seals.

The following describes, firstly, the end plate pressure requirements, and secondly the sidewall pressure issues.

At the terminal ends of the cell stack, one plate has atmospheric pressure on its outer side, while on the inside is the pressure of the cell contents. Either the end wall per se or the end wall plus additional support for the wall must be of sufficient strength to resist any pressure differential. Thus, the last electrode of the stack can be made thick enough to resist the pressure or it can be the same as all of the other internal electrodes, but being supported by a polymeric plate or metal plate of sufficient strength to resist the pressure. A first attempt used a 0.635 cm steel plate in addition to a glass-filled polyphenylene oxide backing plate but this was of insufficient stiffness to allow complete sealing to take place within the cell stack. In a preferred embodiment of the present invention, a 0.953 cm stainless steel plate was then used which was sufficient to provide good sealing. It was found that some degree of deflection of the end walls was due to the pressure of the gases and fluids within the electrolyte frame chambers pushing outward on the end and the inward force applied by tie rods holding the two end plates together.

With reference now to the cell walls and pressure, the internal pressure must also be resisted by the frame members and peripheral o-ring seals. The pressure is from the inside of the electrolyte circulation chambers to the outside atmosphere and is contained by the frame wall and seals. Surprisingly, we have found that gasket seals which are conventionally used are less preferred in preventing leakage of electrolytes even under very small internal pressures of less than one psi. Both gaskets and o-rings are made of elastomers which distort easily under stress and thus provide no structural strength for pressure resistance. In the present cell stack, the structural strength is provided by the frame walls and by their contact with the electrodes and end plate members. The tie rods thus provide the important function of compressing the seals for leak prevention but also provide structural strength by pressing the frame members and electrodes together with the end walls. With gaskets of compressible elastomer material used as structural frame members in plate and frame designs, such as by U.S. Pat. No. 6,080,290, disclosed, for example, in U.S. Pat. No. 6,080,290, issued 2000, the cell generally cannot resist internal pressures greater than a few psi because the gaskets or frame members will expand outward. If sufficient tension from the tie rods is applied to allow friction to hold the gasket or frame member in place, then the gasket or frame member becomes so compressed that their structural function is lost. In the embodiments according to the invention, it is believed that the gaskets would require so much tie rod tension to effect satisfactory sealing, that even the rigid frame members would be susceptible to cracking or compressive failure. In sharp contrast, in the preferred practice of the invention O-ring sealing provides a number of benefits and has been demonstrated to provide a solution to this problem. An O-ring, by virtue of having a much smaller contact area with the frame members, electrodes and end walls than a gasket, does not require excessive tension from tie rods. By locating the O-rings in channels, the compression forces the frame member walls to contact directly with the metal electrodes and, thus, transfers strength to the frame member. Metals, generally, have much higher strengths than polymeric materials. In addition to the strengthening aspect, the cell stack was more rigid than it would have been with a rubbery gasket sandwiched between the cell components. Furthermore, in the preferred embodiment of the invention, the O-ring is prevented from "slipping out" from between the electrodes and frame members by the O-ring channels. Gasket seals, particularly with slippery caustic solutions, are quite susceptible to seal "bowout" if the stack pressure rises. Thus, the current embodiments provides a significant safety advantage.

To conserve linear dimensional space, i.e. to make the cell stack as short as possible, the supporting frame is preferably thin and the O-ring channels offset one from the other within the frame so as not to weaken the frame at directly opposite locations.

We have found that the dimensions of the frame and cell wall structure formed of a structural polymeric material must be of a sufficient longitudal and peripheral thickness as not to expand with pressure and cause leakage or crack.

Thus, the pressurized cell stack aspect of the present invention allows the individual walls and frames to be formed of a structurally rigid plastics material, and optionally supported by metal end plates. The stack may be, most advantageously, operated at an electrolyte solution temperature of at least up to 110° C.

The polymer frames are designed with sufficient width at their upper, lower and side portions as to withstand the internal pressure without additional support. The membranes may be readily bonded by, for example, adhesives or heat and pressure while maintaining precise dimensions.

The most preferred embodiment comprises integration of manifolds, flow control channels, fluid distributors and collectors across the electrolyte circulation chambers and membrane within a single frame. Only four electrolyte ports, namely, anolyte and catholyte input and output sources are required in the end wall.

In most preferred embodiments, the electrodes are relatively thin, e.g. of the order of 0.05–0.1 mm. These makes the stack more compact and comprises monolithic, impermeable, single sheets of foil with no perforations that do not need a second central element, i.e. no sharp, distinct electrode frame to act as a current carrier.

In a further aspect, the invention provides a novel pressure control system of particular value in offering improved pressure regulation at elevated temperatures and relatively high current density which produces relatively high volumes of hydrogen and oxygen gases within the confines of a compact cell and cell stack according to the invention. It is a distinct advantage that such a pressure control system provides for pressure differentials of less than 12 mm water between the anolyte and catholyte circulation chambers and maintains steady this pressure differential to avoid mechanical stress on the separator membrane diaphragm and to avoid electrolyte crossover from anolyte to catholyte or vice versa.

The pressure control system of use in the present invention provides robust and steady control of pressure with a high degree of safety. In consequence of the electrolysis cell reactions, the hydrogen gas flow rate is twice that of the oxygen flow rate. The main features compensate for the differential gas volume generation within the cell, piping and gas liquid separators. This differential in flow rate is not so important in wide gap cells, but in the compact cell stacks according to the present invention, the gas and electrolyte flows experience significant hydraulic resistance due to the narrow gap between walls and constricted flow at exit apertures which must fit within the compact stack structure. Increase in operating temperature, which is important in reducing voltage loss, further requires good pressure control and gas volume management, since the volumes of gas rise directly proportional to the temperature in the cell. Passive cell design control features include a reduction of the electrolyte flow to the anolyte compartment by one-half of the catholyte flow as described hereinafter, in order to achieve the same gas to liquid fraction in both circulating chambers. This provides the same fluid density in both sides, which is important for achieving the same constant liquid level head in the gas liquid separators. The outlet manifolds and tubing are kept as large as possible to minimize friction. The tubing length from the cell stack to the gas liquid separator for the catholyte and hydrogen gas is reduced relative to the anolyte and oxygen gas to compensate for the higher electrolyte plus hydrogen gas flow rate.

The level of the liquid in the, respective, gas liquid separator is used as the first indicator of the pressure differential in the cell stack. The pressure control of the system must allow the liquid levels to stay equal or within some small level of tolerance supported by the membrane. Although electronic control systems may be used to adjust pressure regulators a more direct method is, preferred, involving a matched pair of back pressure regulators—one for oxygen and one for hydrogen. These back pressure regulators are controlled by a common, single compressed gas pressure source. This common single compressed gas always provides the same release pressure to both regulators automatically regardless of the control pressure. With this device the primary pressure balance control is assured. Operation of the cells with this configuration shows exceptionally stable pressure balance during many hours of operation, even at high current density >600 mA/cm$^2$ and temperatures up to 100° C. This control of pressure balance is achieved without the continuous control adjustment that is required by electronic control systems. Furthermore, no sensor input is required for this control and, thus, adds a high level of security to the system.

With all control systems, there is a long term drift that must be addressed. In much of the testing work, occasional manual adjustment of the regulator was required to keep the system in balance. In industrial practice, manual adjustment is not desirable for continuous operation.

Thus, in a further aspect, the invention provides an improved process for providing hydrogen and oxygen gases from an electrolytic cell stack having a spent anolyte solution having an anolyte liquid level and oxygen gas above said anolyte liquid level;

a spent catholyte solution having a catholyte liquid level and hydrogen gas above said catholyte liquid level;

the improvement comprising detecting at least one of said anolyte and said catholyte liquid levels;

releasing said oxygen gas from above said anolyte level when said catholyte liquid level is detected;

or releasing said hydrogen gas from above said catholyte level when said anolyte liquid level is detected;

wherein said detection of said anolyte level comprises irradiating said anolyte liquid level with incident infrared radiation at an angle to effect scattering of said radiation; and wherein said detection of said catholyte level comprises irradiating said catholyte liquid level with incident infrared radiation at an angle to effect scattering of said radiation.

In a further aspect the invention provides an electrochemical stack as hereinabove defined further comprising:

a spent anolyte solution having an anolyte liquid level and hydrogen gas above said anolyte liquid level;

a spent catholyte solution having a catholyte liquid level and hydrogen gas above said catholyte liquid level;

means for detecting said anolyte and said catholyte liquid levels;

valve means for releasing said oxygen gas from above said anolyte level when said catholyte liquid level is detected;

means for releasing said hydrogen gas from above said catholyte level when said anolyte liquid level is detected;

wherein said detection of said anolyte level comprises means for irradiating said anolyte liquid level with incident infrared radiation at an angle to effect scattering of said radiation; and wherein said detection of said catholyte level comprises means for irradiating said catholyte liquid level with incident infrared radiation at an angle to effect scattering of said radiation.

BRIEF DESCRIPTION OF THE DRAWINGS

In order that the invention may be better understood, a preferred embodiment will now be described by way of example only with reference to the accompanying drawings wherein

FIG. 4 is a perspective view of a separator frame and membrane of use in a cell stack according to the invention;

DETAILED DESCRIPTION OF A PREFERRED EMBODIMENT

Figure 1:
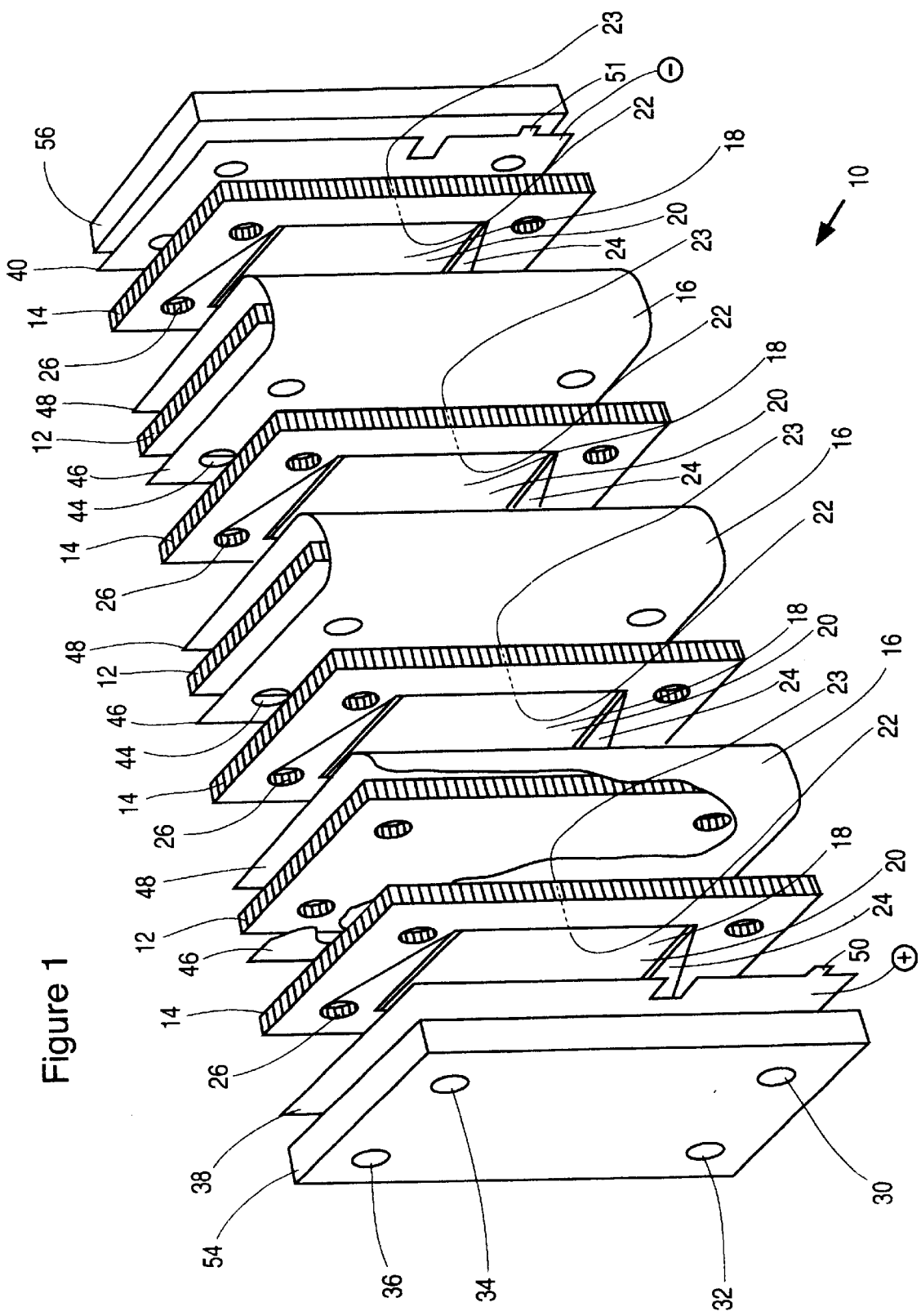
FIG. 1 is a diagrammatic, exploded perspective view of a monopolar, filter press, four-cell stack embodiment, in open-form to enhance understanding, according to the invention.

With reference to FIG. 1, this shows generally as 10, a cell stack of a plate and frame, filter press design comprising multiple subunits. Each sub-unit consists of one side of each of two non-conductive end wall 12 and a non-conductive separator frame 14. Walls 12 and frames 14 are each rectangularly shaped and are formed of a glass fiber-filled polyphenylene oxide (NOREL™, GFN-3, General Electric Company) and measure 15.0 cm wide×22.7 cm long.

End walls 12 are 0.40 cm thick, solid in their middle regions, serve to divide one cell from its adjacent neighbor and to support electrodes 16. Separator frames 14 are 0.63 cm thick and have large rectangularly-shaped apertures 18 within which is a thin (1.2 mm) porous, hydrophilic liquid-conductive separator membrane 20 made of felted polyphenylene sulphide (Ryton™ of Phillips Petroleum) to divide aperture 18 into anolyte circulation chamber 22 and catholyte circulation chamber 23. Membrane 20 prevents intermixing of the electrolysis hydrogen and oxygen product gas bubbles formed on opposite sides, respectively, of membrane 20, and also minimizes the flow of gas-saturated electrolyte from one side to the other. Membrane 20 provides an exposed area of 10 cm×10 cm and is held into frame 14 by thermal pressure bonding to strips of polyphenylene oxide which are then solvent welded to separator frame 14. Tight control of dimensional tolerances, which are essential to a properly positioned flat separator, is achieved by the use of aluminum jigs in both bonding steps.

Figure 3:
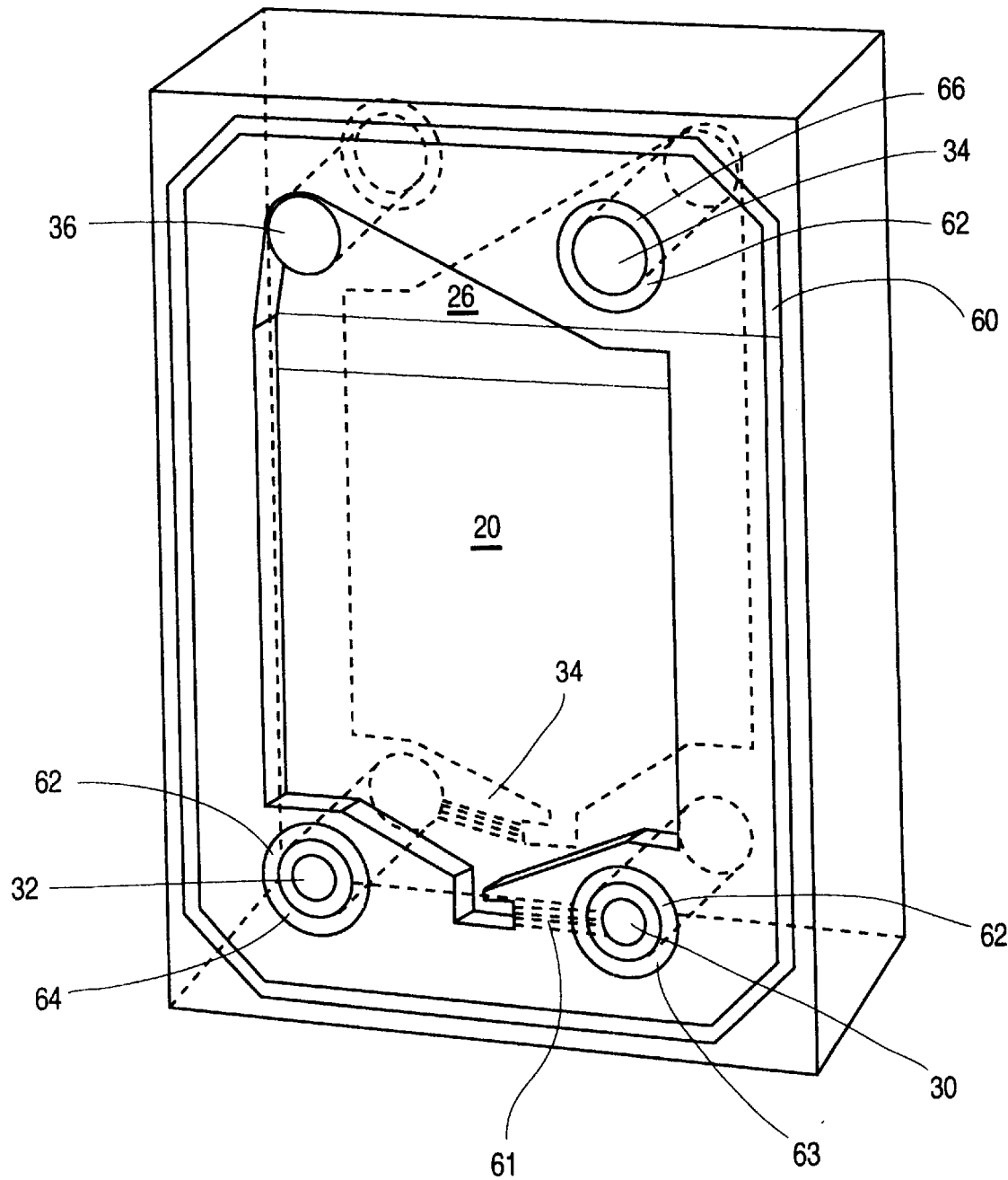
FIG. 3 is a diagrammatic elevational view of a separator frame and membrane of use in a cell stack according to the invention.

Beneath aperture 18, shallow inverted triangular shelves 24 are machined into both sides of frames 14 to distribute the incoming electrolyte in a uniform, vertical flow past the surfaces of electrode 16. Similarly, above aperture 18, shallow triangular shelves 26 are machined into both sides to form collectors that conduct the spent anolyte and catholyte electrolyte and gas mixtures out of the respective circulation chambers 22, 23 while maintaining a uniform vertical flow past electrodes 16 and, also, promoting some bubble coalescence. As seen in FIG. 3 a slot is machined between each inlet manifold hole and the bottom of the appropriate flow distributor shelf at its apex wherein a small polymer bar with a precisely machined hole 61 along its axis is bonded into this slot to control the rate of flow of the incoming electrolyte, which in FIG. 3 is anolyte inlet manifold hole 30.

Each of end walls 12 and membrane frames 14 has four holes drilled through it—two at the bottom to form the anolyte and catholyte manifold inlet 30, 32, respectively, and two at the top to form the spent catholyte and hydrogen, and the anolyte and oxygen, gas manifold outlets 34, 36, respectively.

The two single terminal electrodes, anode 38 and cathode 40, are partially annealed (⅛ hard), commercially pure nickel (Nickel 200). Each is 0.0074 cm thick with a satin finish. Double electrodes 16 are cut from nickel sheet of the same type and four manifold holes 44 and four locating holes are drilled in each half. The sheet is folded in a U shape around one side of each end wall 12. One half acts as a cathode 46 and one half as an anode 48, and are thus electrically connected through the central bend portion of the sheet. This double electrode plate arrangement results in a stack of monopolar cells that are connected in series. In the assembled stack, electrolysis occurs on an area 10×10 cm square located in the middle of each electrode on the side adjacent to the central cavity of the separator frame. No surface treatment or other procedure was used to activate the electrodes for increased energy efficiency.

The description hereinabove of the components of stack 10 is modified slightly for the components at each end. End electrodes 38, 40 are single and terminate outside stack 10 in tabs 50, 51, respectively. These tabs are sandwiched between two strips of copper 0.1 cm thick (not shown), which are compressed into the nickel electrode by small bolts (not shown). This connection provides a good, low resistance electrical contact that ensures an even current distribution in end electrodes 38, 40 to minimize resistive heating at the copper-nickel contact. The two non-conductive end backing plates 54, 56, respectively, at the ends of the stack are thicker (1.2 cm) than internal end walls 12 so that they can be drilled and tapped at the ends of the inlet and outlet manifolds to accept o-ring seal connectors (not shown) through which electrolyte will enter and leave the stack along with the hydrogen and oxygen gases.

The apparatus of the present invention preferably provides electrolyte and gas sealing by the use of o-rings, preferably, formed of ethylene-polypropylene rubber, and located within the stack as follows.

A pair of concentric, offset o-ring grooves are machined around the holes that form the inlet manifolds on both sides of the frame or plate. The holes forming the outlet manifolds each have only one concentric o-ring groove (the opposite side of the plate or frame is the outlet channel). Manifold o-rings are inserted into the grooves of the frames and plates prior to their assembly into the stack. A pair of offset o-ring grooves are machined into both sides of the plates and frames around the periphery of the cell into which the wall o-rings are inserted. Finally, four locating holes are drilled into the four corners of the plates and frames to ensure precise alignment during the compression of the stack after assembly.

FIG. 4 represents a membrane frame 14, shown split apart down a central vertical plane in order to better illustrate the frame features on the backside.

With reference to FIGS. 3 and 4 in order to seal stack 10, an arrangement of o-rings are located in grooves 60, 62 in each frame 14 and end wall 12. Since these o-rings must seal against flexible electrode 16, the mating o-rings on either side of electrode 16 are offset from each other so that the this nickel foil is backed by the adjacent frame to provide support. Inlet manifold seal 64 must maintain only a small pressure differential, while the outlet manifold seal 66 has essentially no pressure differential. In contrast, the peripheral wall seal 60 must sustain the entire internal pressure of up to 100 psig and so its performance is critical to the integrity of the stack. The precise alignment of frames 14 and endwalls 12 in the stack that is necessary to ensure that the seals will be offset and function properly is achieved by the insertion of hardened steel pins into the four locator holes in each corner of each component during assembly. Manifold conduits 61 and 63 represent control channels for anolyte input flow and catholyte input flow, respectively.

External Support

In order to support the end walls and to maintain the integrity of the o-ring seals between adjacent frames within the stack against the internal pressure, in this embodiment the entire stack is confined between two stainless steel terminal end plates 0.953 cm thick adjacent to the end frames 14. These end plates are held together by six 7 mm or 1 cm connecting rods with threaded ends that pass close to but do not touch the top, bottom and sides of the stack. When put under tension using a torque wrench, these rods provide 6000 lb of compressive force to the end plates. The end plates measure 19 cm×27 cm and have holes 38 mm in diameter to accommodate the manifold connectors that are attached to the end frames. Thin 0.8 mm rubber sheets are interposed between the end plates and the end frames. These accommodate the small dimensional changes in the end plates and stack as the rods are put under tension, and as the stack expands during heating and increasing internal hydrostatic pressure and, thus, maintain an even, constant compressive force on the stack. Without these cushions, the small movements that occur when the stack is initially compressed and when it goes through the temperature and internal pressure changes during the operating cycle may overstress the frames and lead to cracking.

In operation, in the embodiment shown, the electrolyte is a solution of 30% by weight, commercial-grade potassium hydroxide dissolved in deionized water and is driven through stack 10 by a pump (not shown). The electrolyte enters stack 10 through the two inlet manifolds 30, 32 and is distributed to cell compartments 22, 23 from each manifold via flow control channels 61 and 63, flow control channel 61 supplying anode chamber 22 and the other, 63, supplying cathode chamber 23. The flow control channels 61 are designed to ensure an equal flow of electrolyte into each cell and in the proper anolyte to catholyte flow ratio of 1:2. This is achieved by constructing flow control channels 61 and 63 of the proper length and diameter to ensure a pressure drop of about 1 psi when electrolyte is pumped through stack 10 at the proper total flow rate and desired flow ratio. The spent electrolytes, now containing hydrogen or oxygen gas bubbles, leaving each cell compartment is directed into two outlet manifolds 34, 36, respectively, past shelves 26 at the top of each circulation chamber. This exit system allows the gas-bearing electrolytes to flow freely with a minimum pressure drop.

Figure 2:
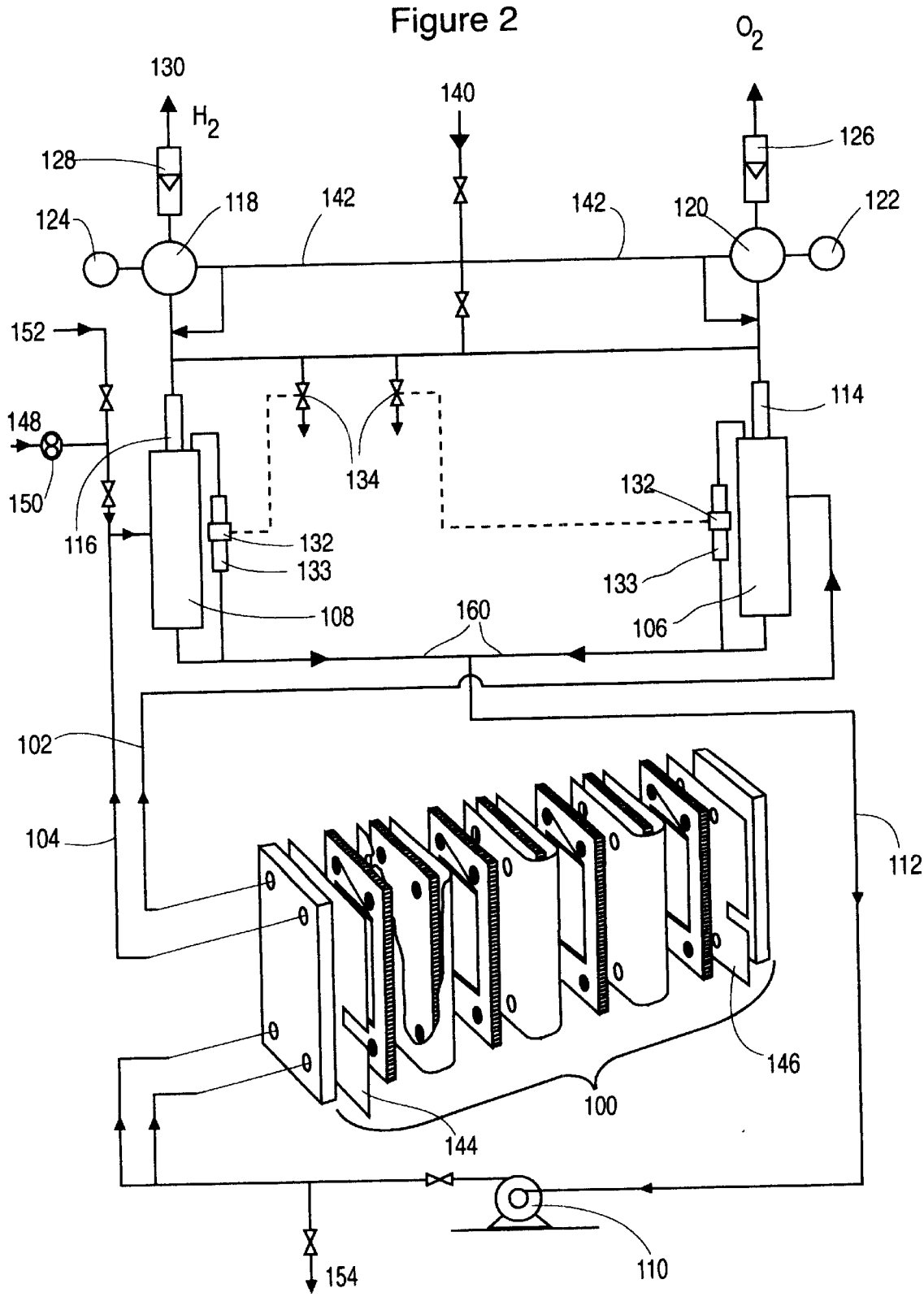
FIG. 2 is a schematic flow diagram of the process operation with a two cell stack electrolyser embodiment according to the invention.

With reference also to FIG. 2 in operation, electrolyte is pumped into stack 100 via the inlet manifold connectors. The gas-bearing electrolytes leaving the two outlet manifold connectors are conducted via separate pipes 102, 104 to two gas-liquid separators 106, 108, respectively, that remove the hydrogen and oxygen and return bubble-free electrolyte solutions to pump 110 for recirculation to stack 100. It is important to maintain the same pressure in the two outlet manifolds to minimize movement of electrolyte from one compartment to the other through membrane 20 and minimize hydrostatic stress across the membranes in the cells.

With further reference to FIG. 2, this shows in more detail in operation, a centrifugal pump 110 that delivers 30% w/w potassium hydroxide aqueous electrolyte at a rate of 0.8 L/min per cell into cell stack 100, via the inlet manifold connectors. The hydrogen and oxygen gas-bearing spent electrolytic solutions leave the stack as described aforesaid. Inside separators 108, 106, the hydrogen and oxygen bubbles are separated from the electrolyte solution by gravity. The bubble-free electrolytes then leave the bottom of each separator and re-circulate to stack 100 via a common return 112. Alternatively, the electrolyte may also be returned to the stack in separate streams instead of being combined into a common stream.

The separated oxygen and hydrogen gases pass upward through a packed column 114, 116, respectively, that serve to cool the gases and remove electrolyte mist and condensed water vapour from them. The cool, demisted gases then pass through two back-pressure regulators 118, 120, respectively, that maintain the desired system pressure as indicated by two pressure regulator gauges 122, 124, respectively. The rate of outflow of dry gas at atmospheric pressure from regulators 122, 124 is monitored by two flow meters 126, 128, respectively. The oxygen is generally vented to atmosphere and the hydrogen passed to storage 130. Visual monitoring of the liquid levels in the separators is by means of sight glasses 133 attached to them. This allows maintenance of a pressure differential between the two outlet streams of less than 75 mm of water. This function may be automated by attaching an infrared level sensor 132 to each of sight glasses 133, each of which controls its respective solenoid valve 134. By thus venting gas either from the hydrogen gas/liquid separator or the oxygen gas/liquid separator it is possible to achieve even tighter control of the pressure differential.

Although the pressure in the entire cell stack and supporting system is high (up to 100 psig), in this embodiment, the pressure drop due to flow through the system is only a few psi, so the power of pump 110 required is quite small. The system pressure may be generated, initially, either by an external, inert gas supply 140 or by the internally generated hydrogen and oxygen gases. It is maintained during operation by the evolving gases and back pressure regulators 118, 120. The same external inert gas supply may be also used to maintain an identical controlling pressure in both domes of regulators 128, 129 via lines 142. Stack 100 is maintained at the desired operating temperature by either heating or cooling the electrolyte externally, or by placing insulation or cooling fans on stack, 100, per se. The need for heating or cooling is determined by the heat balance of the entire system during operation. The electrolysis process generates a substantial amount of heat, depending on its efficiency.

A direct electric current is provided from a Xantrax™ power supply by 8 gauge copper cables that are fastened by bolts to the copper strips (all not shown) that are attached to the two end electrodes 144, 146. Sufficient voltage is applied to drive the desired current of 50 or 60 amps through the stack. This provides a current density on the electrodes of 500 or 600 mA/cm$^2$.

A small amount of deionized water 148 may be continuously or periodically pumped into the system by a diaphragm pump 150 to replace the water consumed by electrolysis and leaving as water vapour with the hydrogen and oxygen gases. In the present embodiment, the potassium hydroxide electrolyte is added to the system through inlet conduit 152 or drained from it through outlet conduit 154, when the system is not operating and is at atmospheric pressure.

The stack is designed to operate either intermittently or continuously at pressures between 60 and 100 psig and temperatures between 60 and 100° C. At a current of 50 amps, the production rate of hydrogen gas on a dry basis is 913 standard liters per hour for a stack of 40 cells.

Figure 6:
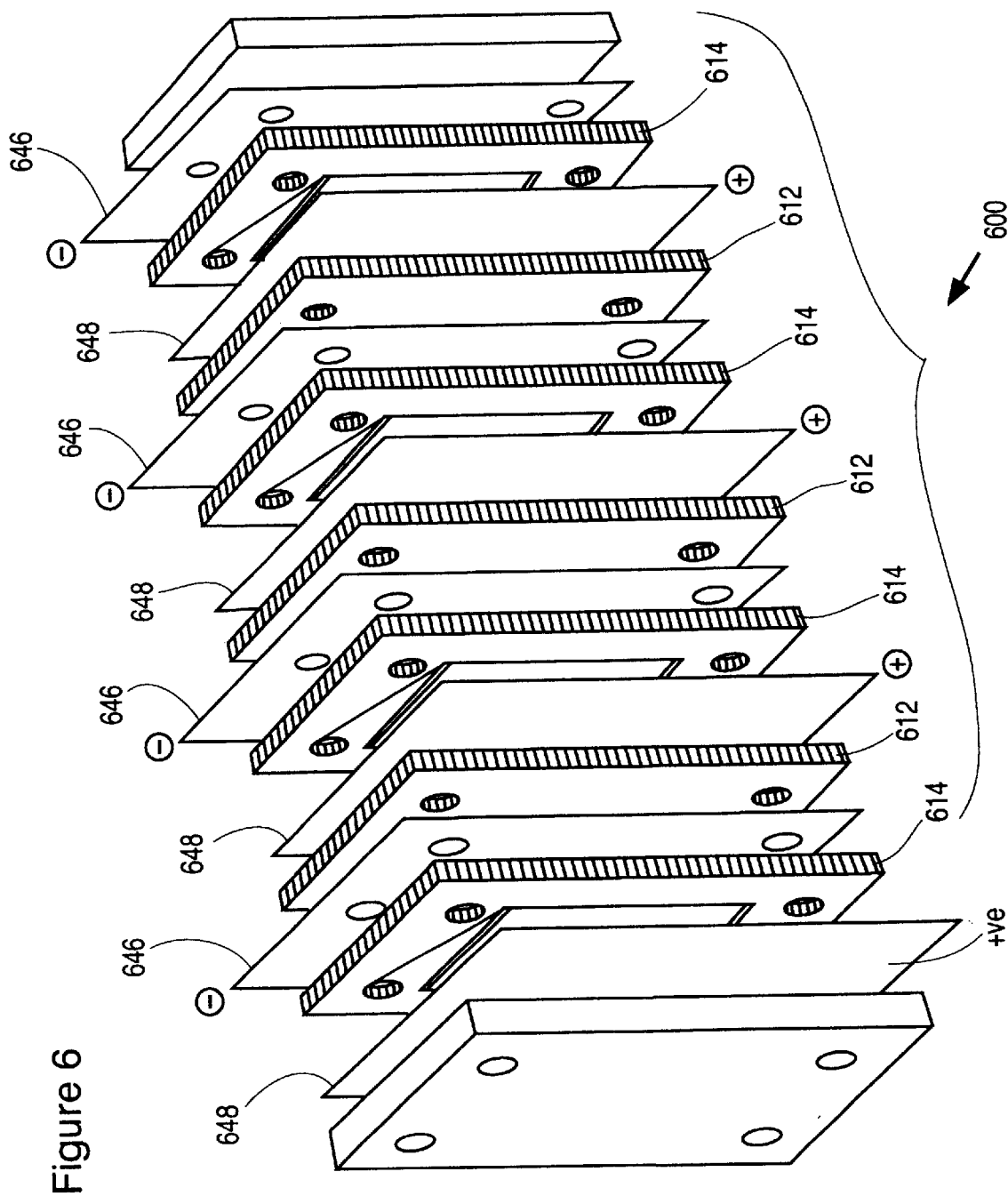
FIGS. 6, 7 and 8 are diagrammatic, exploded perspective views of alternative embodiments of cell-stacks, according to the invention.

With reference to FIG. 6, this shows a cell stack 600 of a plate and frame, filter press design comprising four subunits according to the invention, wherein each anode 648 and cathode 646 is a single electrode plate. Each sub-unit consists of one side of each of two non-conductive end walls 612 and a non-conductive separator frame 614. Walls 612 and frames 614 are each rectangularly shaped and formed of a glass fibre-filled polyphenylene oxide and measure 15.0 cm wide by 22.7 cm long, as described hereinbefore with reference to FIG. 1.

For very high current density applications, it may be appropriate to use thicker cathodes 646 and anodes 648. Electrodes 646, 648 are single, rectangular, planar members which conveniently extend from stack 600 on the front side for 648 anodes and on the back side for cathodes 646. This configuration allows connection to an anode bus bar on the front side and a cathode bus bar on the back side, and has the minimum voltage requirement, since each cell in the stack is operating in parallel. Other features of the cell are as hereinbefore described in the details of FIG. 1.

Figure 5:
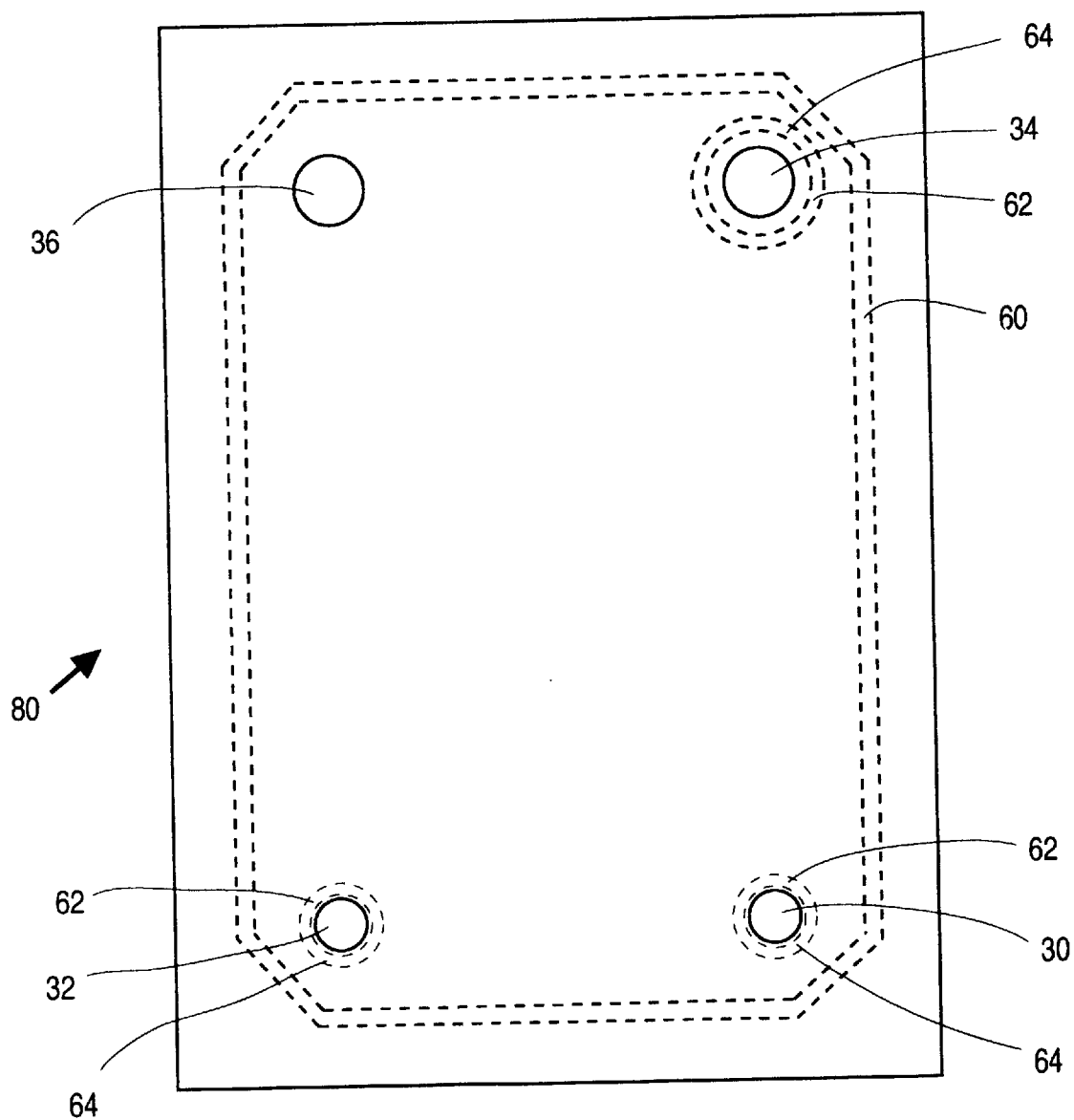
FIG. 5 is a diagrammatic elevational view of a cell wall of use in a cell stack according to the invention.

FIG. 5 shows an elevational view of an end wall 80 of a cell within a cell stack according to the invention having inlet anolyte channel 30, inlet catholyte channel 32, outlet spent anolyte channel 36 and outlet spent catholyte channel 34. Each cell wall on each side has an o-ring receiving peripheral groove 60 and circular o-ring receiving recesses 62 for o-rings 64.

It is clear from FIG. 6, that since each unit is independent of the other, each internal cell could be reversed such that the electrode connections could be anode cathodecathode anodeanode cathode**. The advantage of this latter configuration is that the pairs of anode terminals and pairs of cathode terminals are joined before being connected to the bus bar. This is an advantage for thin foil electrodes, which do not have much stiffness. Paired connections would be more robust in an industrial setting.

Figure 7:
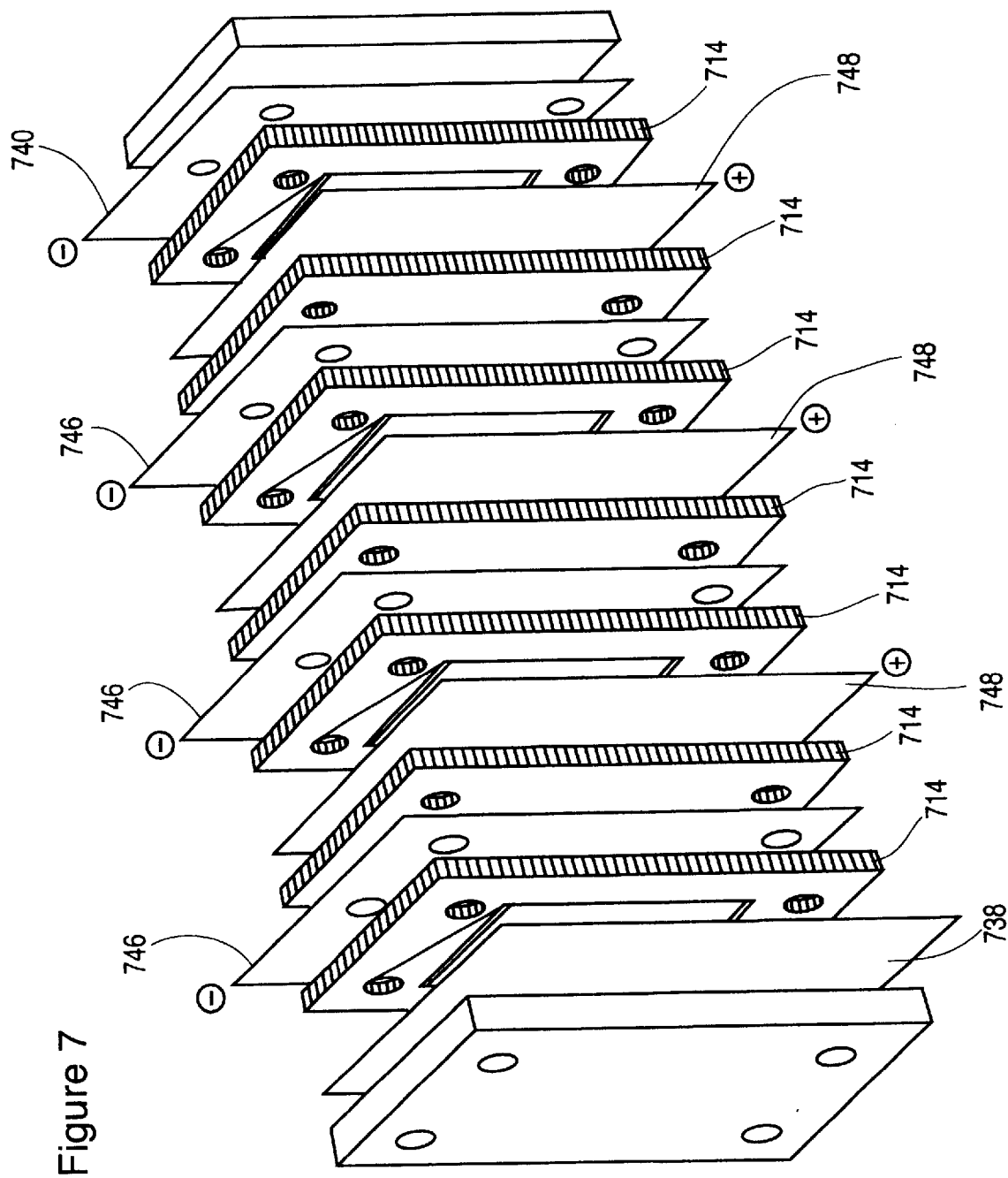

With reference to FIG. 7, this shows a similar filter press cell stack design comprising seven subunits, each having a non-conductive separator frame 714 similar to that in FIG. 6. However, FIG. 7 does not include non-conductible end cell-wall members 612 of FIG. 6, and, accordingly, each anode 748 and cathode 746 functions with both of their sides active. A single anode 738 and a single cathode 740 with only one side are required for the first and last subunits of the cell stack. The unitized separator frame 714 mates to the first anode by means of the o-ring seating described earlier. A single cathode 746 mates to the facing side of the separator frame and completes the first subunit cell. The obverse side of the single cathode is also the cathode for the second subunit and mates to the catholyte flow channel side of the next unitized separator frame 714. The second anode mates to the anolyte flow channel side of that unitized separator frame 714 and completes the second sub-unit. The obverse side of the second anode is the anode for the start sub-unit 3 and mates to the anolyte flow channel side of the third unitized separator frame. This connection of cells continues until the terminal anode which is active on one side only. The advantage in this configuration is the elimination of the cell end walls. In comparing FIG. 6 and FIG. 7 it is clear that the design of FIG. 7 provides a seven cell stack in the same space that only four cells were provided by the design in FIG. 6.

Figure 8:
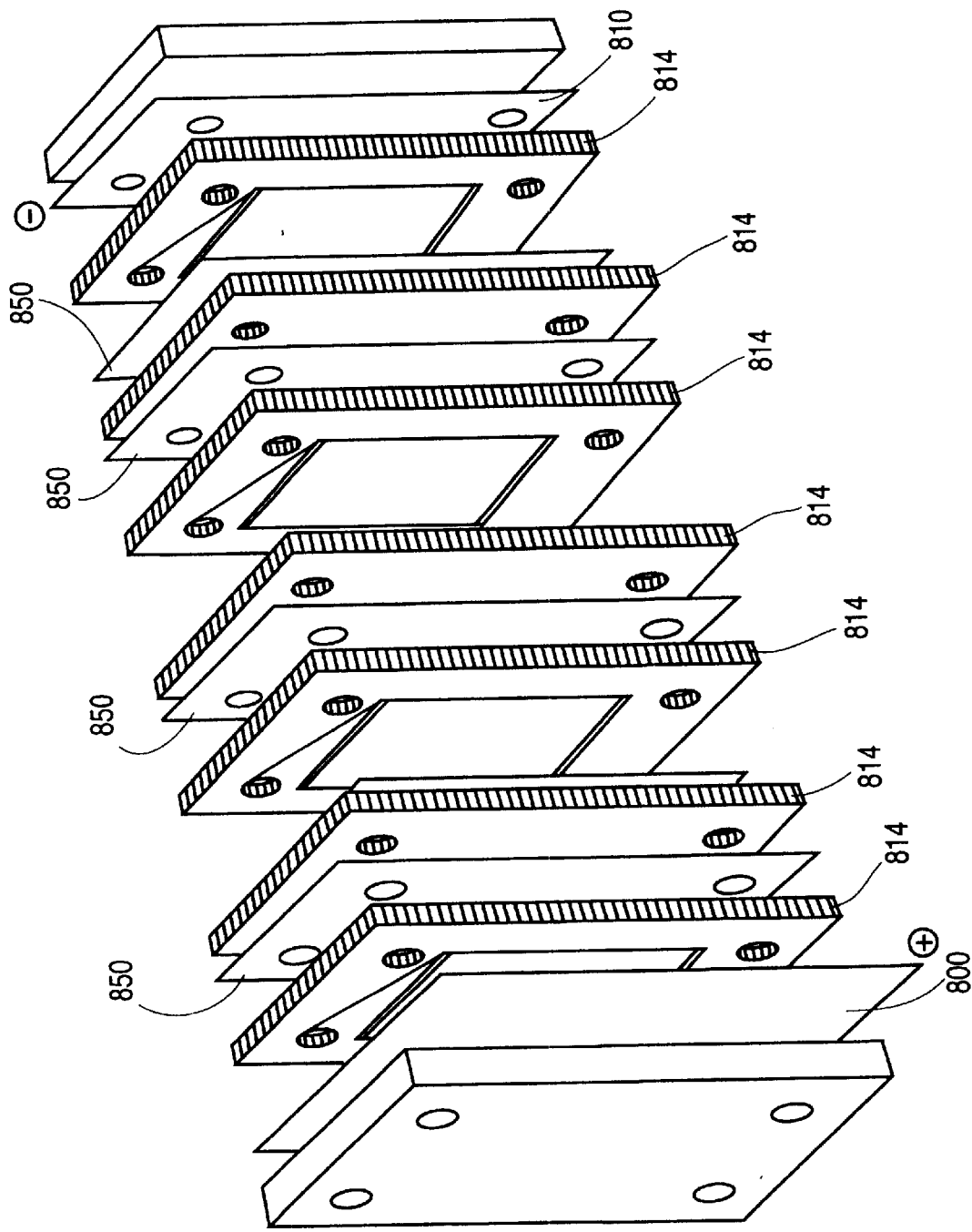

FIG. 8 shows unitized separator frames in a bipolar cell stack configuration. Only the end electrodes 800, 810 are connected to the power supply. The internal electrodes 850 operate in the bipolar state with one side being anodic and the other side being cathodic. End electrode 800 is connected to the positive high voltage side of a dc power supply, while end electrode 810 is connected to the negative high voltage side of the dc power supply. The internal 850 electrodes are electrically isolated and do not need tabs for connection to a bus bar. As is well known, the advantage of bipolar configuration over a conventional monopolar configuration is that only two electrical connections are needed per cell stack at the expense of a higher voltage requirement for the stack. The voltage requirements for this arrangement depend on the number of cells in the stack. The seven subunit cell stack shown in FIG. 8 requires a power supply with about 14V capability.

The advantages of the unitized frame separator are equally conveyed to bipolar cell stack configurations. The combination of the flow channels and membrane separators as shown as 814 allows a more compact cell design and reduces the number of seals required. For example the end wall members and their respective seals are not required in this configuration. Furthermore because the current is delivered to the cell stack from the end electrodes and current is passed through the stack via ions to each electrode face rather than from the external edge connectors as in monopolar designs there is less electrolyte resistive heating. Furthermore since the electrical current passes perpendicularly through the electrode rather than along its width to the external busbar there is less metal resistance heating. Less resistive heating in the electrodes means that higher current densities can be applied to the cell stack before heating of the polymeric walls and frames in contact with the electrodes becomes a limitation. The advantages of the bipolar cell configuration over monopolar configurations with respect to resistances are well known. The advantage of the unitized frame separator in this configuration is that it provides a single compact unit having gas flow balanced flow channels, membrane separator and inlet and outlet ports that can be readily combined in a stack. It should be obvious to one skilled/in the art that in order to prevent the mixing of anolyte and catholyte in the exit manifolds in this bipolar configuration, that a seal must be provided on one side of each exit manifold as was described in FIG. 1. For the bipolar configuration however there is no endwall frame member to support the seal. Therefore the electrode member must be of sufficient stiffness to provide the seal against the unitized frame separator exit manifold O-ring. For example a slightly thicker nickel electrode material than that described in FIG. 1 and which had been hardened could be used for this purpose.

The aforesaid most preferred monopolar filter press cell stack is of an overall external rectilinear shape which conserves space, being more compact, as compared to the usual prior art cylindrical design. It also provides the following advantages in consequence of the shapes and configurations used in the cell stack design.

The end walls and frames are selected to be as thin as possible, consistent with the depth required by the O-ring grooves, to conserve space and increase cell efficiency by more closely spacing the anode and cathode and, thus, providing for lower cell resistance.

The O-rings on either side of the electrodes are offset from one another to seal against the thin electrode, where it will be supported by the substance of the plate or frame. Large O-rings are positioned to include all pressurized parts of the cell within them so that these are the only seals that must withstand and seal against any high pressure differential.

The present invention allows of a small diameter of inlet manifold to conserve space, yet still functions as a header to provide equal pressure at the flow control channel to each cell. This is achieved because the flow control channels have a much smaller diameter than the inlet manifold. It also allows of flow control channel diameters and lengths that are sized to produce desired pressure drops and relative flow rates to the anode and cathode compartments. It further allows for the stream of electrolyte leaving the flow control channel to impinge on a perpendicular surface that diffuses the incoming jet and, thus, ensures a uniform vertical upward flow of electrolyte over the electrode surface. A gradual widening of the inlet shelf, in the general form of an inverted triangle, which is cut as deeply as possible into the frame also ensures the uniform upward flow of electrolyte over each of the electrode surfaces within each of the anolyte and catholyte circulation chambers. In this preferred embodiment, the gas-evolving area has an aspect ratio of unity to minimize bubble content of electrolyte, for maximum energy efficiency, while still ensuring an even flow of electrolyte over the electrode. The outlet shelves are as large as possible and empty into the outlet manifolds through apertures that are as large as possible to minimize any variation in back pressure in the electrolysis chambers that would result in a differential pressure across the separators. Similarly, the outlet manifold diameters are a large as possible.

The significantly relative thinness of electrodes conserve space, conserve metal and allow easy assembly with no residual stresses on the other components of the assembled stack. The nickel foil electrodes are as large as possible in order to conduct current from one gas-evolving area to the next with minimum resistive losses.

With reference again to FIG. 2, the robust and steady pressure differential control system of use in the practice of the present invention is now described.

The fine control of this pressure system is achieved by use of an IR light sensor 132 on each of the liquid level site tubes 133. The efficacy of this light detection method is unexpected since the electrolyte is transparent and, accordingly, blockage of the light by the electrolyte was not anticipated. When the sensitivity of the detector was reduced sufficiently to record the difference between light passing through the empty tube and the electrolyte-filled tube, ordinary lighting would interfere with the sensor. However, we discovered that if the light source is angled sufficiently from the detector, and the detector sensitivity adjusted, then the electrolyte allows passage of the light beam when the site glass was filled, but would reflect the light beam if the liquid meniscus passed through the site glass. With this configuration for the detector and light source, if the liquid level fell below the level at the light sensor, then the infrared beam from the light source was reflected and tripped a relay to energize the appropriate throttled solenoid valve 134 to cause bleeding of a requisite small amount of gas from the high pressure side. The liquid level would then rise and return to the normal operating level. One advantage of this type of fine control over that described in the prior art, is that the sensor is outside of the electrolyte and, thus, not susceptible to corrosion or blockage. Further, the sensor and controller are easily inspected, tested and replaced if necessary, without the need to shut down the system. Testing can be done by blockage of the light beam with a piece of paper between the light beam and sensor and listening for the bleed valve activation. The pressure control sensitivity does not depend on the sensitivity of the sensor, since it is a simple on-off system. The level detector is easily adjusted by mechanically moving the light source and detector to the desired position of the liquid site tube. The high/low signal system is well understood and has reliable mechanical relays. Fine control of long term drift is thus easily achieved.

Thus, the aforesaid pressure differential control system provides a unique pressure control system up to 6 atmospheres absolute with a pressure differential of less than 12 mm of electrolyte, safely and reliably and inexpensively.

Figure 9A:
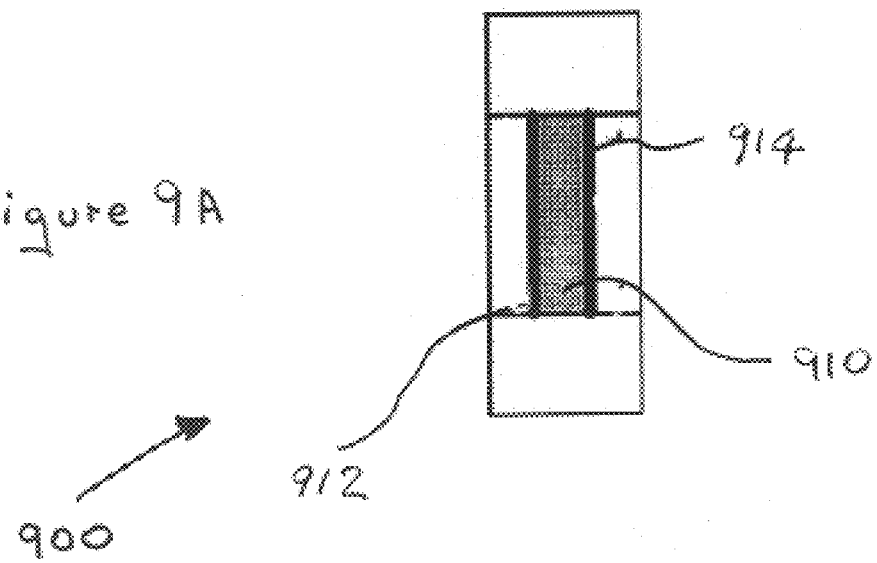
FIG. 9A and FIG. 9B are diagrammatic representations of coated membranes of use in the practice of the invention.

FIG. 9A shows a membrane assembly shown generally as 900 having a ceramic porous body 910 with a nickel anode coating 912 on one side and a nickel cathode coating 914 on the other to provide a tricomponent membrane.

Figure 9B:
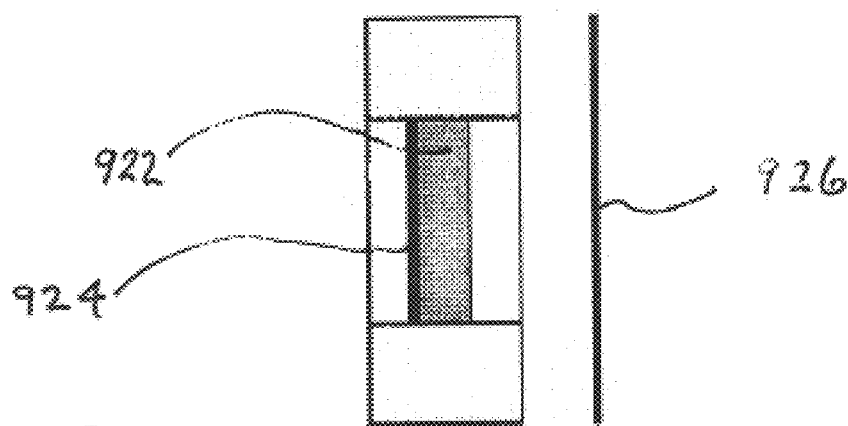

FIG. 9B shows an analogous bicomponent membrane 920 of a membrane body 922 having a nickel anode coating 924, in combination with an adjacent planar nickel plate cathode 926.

EXAMPLE

A partial stack according to FIG. 1 has been operated typically at 50 A, 67 psig and 95° C. with an electrolyte flow rate of 0.8 L/min per cell. The voltage required is 2.15 V per cell indicating an energy efficiency of 69.4% based on the higher heating value of hydrogen. With a common electrolyte return, the current efficiency is 97.5% and the hydrogen production rate is 22.2 standard L/h per cell.

Although this disclosure has described and illustrated certain preferred embodiments of the invention, it is to be understood that the invention is not restricted to those particular embodiments. Rather, the invention includes all embodiments which are functional or mechanical equivalents of the specific embodiments and features that have been described and illustrated.

What is claimed is:

1. An electrochemical cell stack comprising stack walls and a plurality of electrolytic cells within the stack walls, each cell comprising cell members selected from an anode;

a cathode;

a membrane separator frame formed of a non-conductive material and having a first side and a second side opposite to the first side;

said frame having
   a. a frame first planar peripheral surface on said first side;
   b. a frame second planar peripheral surface on said second side; and
   c. a central portion defining a membrane-receiving aperture;

a membrane within the aperture to provide an anolyte circulation chamber and a catholyte circulation chamber, distinct one from the other, within said frame;

an impermeable cell end wall formed of a non-conductive material between said anode and said cathode and the anodes and cathodes of adjacent cells of said stack;

wherein each of said anode, said cathode, said separator frame and said end wall has a portion defining an anolyte flow inlet channel, a catholyte flow inlet channel, a spent anolyte channel and a spent catholyte channel; and wherein said anolyte flow inlet channel and said spent anolyte channel are in communication with said anolyte circulation chamber, said catholyte flow inlet channel and said spent catholyte channel are in communication with said catholyte circulation chamber; and wherein said anode has an anode first planar surface which abuts said frame first planar peripheral surface as to define with said member said anolyte circulation chamber within the confines of said frame, and said cathode has an cathode second planar surface which abuts said frame second planar peripheral surface as to define with said member said catholyte circulation chamber within the confines of said frame.

2. A cell stack as defined in claim 1 wherein said anode in whole or in part is disposed within said anolyte circulation chamber and said cathode in whole or in part is disposed within said catholyte circulation chamber.

3. A cell stack as defined in claim 2 wherein said anode is in contact with said membrane within said anode circulation chamber and said cathode is in contact with said membrane within said cathode circulation chamber.

4. A cell as defined in claim 3 wherein said anode is formed as a laminate with, or coating on said membrane and said cathode is formed as a laminate with, or coating on said membrane.

5. A cell stack as defined in claim 1 wherein said anolyte circulation chamber has a lower portion defining an inverted triangle having an apex defining an anolyte entry port in communication with said anolyte flow inlet channel, and an upper portion defining a triangle having an apex defining an anolyte exit port in communication with said spent anolyte channel; and said catholyte circulation chamber has a lower portion defining an inverted triangle having an apex defining a catholyte entry port in communication with said catholyte flow inlet channel, and an upper portion defining a triangle having an apex defining a catholyte exit port in communication with said spent catholyte channel.

6. A cell stack as defined in claim 5 wherein said anolyte entry port is central of said frame;
   said anolyte exit port is adjacent a first periphery of said frame;
   said catholyte entry port is central of said frame; and
   said catholyte exit port is adjacent the periphery remote from said first periphery.

7. A cell stack as defined in claim 1 further comprising a plurality of compressible sealing members dispersed between adjacent cell members selected from said anode, said cathode, said frame and said cell wall, at the peripheries thereof and adjacent said anolyte and catholyte flow inlet channels and said spent anolyte and catholyte channels.

8. A cell stack as defined in claim 7 wherein said compressible sealing member is an o-ring, and said cell members have portions defining o-ring receiving recesses.

9. A cell stack as defined in claim 1 wherein said frame and said cell end wall are formed of a polymeric, engineered plastics material.

10. A cell stack as defined in claim 1 wherein said anode and said cathode are in the form of a metallic foil having a thickness selected from 0.05–0.1 mm.

11. A cell stack as defined in claim 1 in a monopolar filter press arrangement.

12. A cell stack as defined in claim 1 in a bipolar arrangement.

13. A cell stack as defined in claim 1 wherein said stack walls are subjectable to a cell stack external pressure;
   said anode operably produces oxygen at an oxygen pressure within said anolyte chamber;
   said catholyte operably produces hydrogen at a hydrogen pressure within said catholyte chamber;

means for providing each of said oxygen pressure and said hydrogen pressure with a positive pressure differential greater than said cell stack external pressure; and said membrane separator frames and said impermeable cell end wall are formed of a structural plastics material.

14. A cell stack as defined in claim 13 wherein said external pressure is provided by air at atmospheric pressure.

15. A cell stack as defined in claim 14 further comprising means for providing said positive pressure differentials selected from 2–6 atmospheres.

16. An electrochemical stack as defined in claim 1 further comprising a spent anolyte solution having an anolyte liquid level and hydrogen gas above said anolyte liquid level;

a spent catholyte solution having a catholyte liquid level and hydrogen gas above said catholyte liquid level;

means for detecting said anolyte and said catholyte liquid levels;

valve means for releasing said oxygen gas from above said anolyte level when said catholyte liquid level is detected;

means for releasing said hydrogen gas from above said catholyte level when said anolyte liquid level is detected;

wherein said detection of said anolyte level comprises means for irradiating said anolyte liquid level with incident infrared radiation at an angle to effect scattering of said radiation; and wherein said detection of said catholyte level comprises means for irradiating said catholyte liquid level with incident infrared radiation at an angle to effect scattering of said radiation.

* * * * *